US00RE49388E

(19) United States
(12) Reissued Patent
Seen et al.

(10) Patent Number: US RE49,388 E
(45) Date of Reissued Patent: Jan. 24, 2023

(54) DISPLAY PANEL AND MOBILE TERMINAL

(71) Applicant: LG Electronics Inc., Seoul (KR)

(72) Inventors: Seungmin Seen, Seoul (KR); Seongcheol Lee, Seoul (KR); Gunseek Oh, Seoul (KR); Jonglin Im, Seoul (KR); Jeongwoo Lee, Seoul (KR)

(73) Assignee: LG Electronics Inc., Seoul (KR)

(21) Appl. No.: 16/013,700

(22) Filed: Jun. 20, 2018

Related U.S. Patent Documents

Reissue of:
(64) Patent No.: 9,799,276
Issued: Oct. 24, 2017
Appl. No.: 15/431,212
Filed: Feb. 13, 2017

U.S. Applications:
(63) Continuation of application No. 15/047,275, filed on Feb. 18, 2016, now Pat. No. 9,607,567, which is a
(Continued)

(30) Foreign Application Priority Data

Mar. 2, 2015 (KR) ..... 10-2015-0028947

(51) Int. Cl.
*G09G 3/34* (2006.01)
*G09G 3/36* (2006.01)
(Continued)

(52) U.S. Cl.
CPC ..... *G09G 3/342* (2013.01); *G02B 6/0021* (2013.01); *G02B 6/0068* (2013.01); *G02B 6/0078* (2013.01); *G02F 1/1368* (2013.01); *G06F 3/0412* (2013.01); *G06F 3/04845* (2013.01); *G09G 3/3406* (2013.01);
(Continued)

(58) Field of Classification Search
None
See application file for complete search history.

(56) References Cited

U.S. PATENT DOCUMENTS 7,515,223 B2 4/2009 Lee et al.
8,118,466 B2 2/2012 Cho et al.
(Continued)

FOREIGN PATENT DOCUMENTS

CN 1540440 10/2004
CN 102883033 1/2013
(Continued)

OTHER PUBLICATIONS

Extended European Search Report for European Application No. 18172630.8, dated Jul. 17, 2018.
(Continued)

*Primary Examiner* — Yuzhen Ge
(74) *Attorney, Agent, or Firm* — Fish & Richardson P.C.

(57) ABSTRACT

A display panel comprising a light guide plate; a main light source configured to emit light from a first lateral surface of the light guide plate in a first direction; a sub-light source configured to emit light from a second lateral surface vertical to the first lateral surface of the light guide plate in a second direction perpendicular to the first direction; and a liquid crystal panel provided in a front surface of the light guide plate and configured to output image information.

19 Claims, 10 Drawing Sheets

Related U.S. Application Data continuation of application No. 14/720,200, filed on May 22, 2015, now Pat. No. 9,305,505.

(51) Int. Cl.

| | |
|---|---|
| ***F21V 8/00*** | (2006.01) |
| ***G02F 1/1368*** | (2006.01) |
| ***G06F 3/041*** | (2006.01) |
| ***G06F 3/04845*** | (2022.01) |
| ***H04M 1/22*** | (2006.01) |
| *G02F 1/1333* | (2006.01) |

(52) U.S. Cl.

CPC ..... *G09G 3/3648* (2013.01); *G09G 3/3677* (2013.01); *G09G 3/3688* (2013.01); *H04M 1/22* (2013.01); *G02F 1/133391* (2021.01); *G06F 2203/04108* (2013.01); *G09G 2300/0809* (2013.01); *G09G 2310/0297* (2013.01); *G09G 2310/04* (2013.01); *G09G 2310/061* (2013.01); *G09G 2320/064* (2013.01); *G09G 2320/0646* (2013.01); *G09G 2320/08* (2013.01); *G09G 2330/021* (2013.01); *G09G 2330/023* (2013.01); *G09G 2354/00* (2013.01)

(56) References Cited

U.S. PATENT DOCUMENTS

| | | | | |
|---|---|---|---|---|
| 8,466,999 | B2 | 6/2013 | Shiau et al. | |
| 8,506,151 | B2 | 8/2013 | Park | |
| 8,532,596 | B1 | 9/2013 | Park | |
| 9,143,668 | B2 | 9/2015 | Mathew et al. | |
| 9,894,781 | B2 | 2/2018 | Franklin et al. | |
| 2004/0095522 | A1 | 5/2004 | Lee et al. | |
| 2004/0212555 | A1 | 10/2004 | Falco | |
| 2006/0087486 | A1* | 4/2006 | Lee | G09G 3/342 345/102 |
| 2006/0291240 | A1 | 12/2006 | Kim et al. | |
| 2008/0196047 | A1* | 8/2008 | Kim | G06F 3/0412 719/323 |
| 2009/0121987 | A1* | 5/2009 | Fukutome | G09G 3/3406 345/82 |
| 2009/0129049 | A1 | 5/2009 | Lee et al. | |
| 2010/0045621 | A1 | 2/2010 | Kang et al. | |
| 2011/0102407 | A1 | 5/2011 | Cho et al. | |
| 2011/0227487 | A1* | 9/2011 | Nichol | G02B 6/0018 315/158 |
| 2011/0273906 | A1* | 11/2011 | Nichol | G02B 6/0076 362/607 |
| 2012/0057367 | A1* | 3/2012 | Park | G02F 1/133603 362/606 |
| 2012/0120128 | A1* | 5/2012 | Oh | G09G 3/003 345/691 |
| 2012/0250291 | A1 | 10/2012 | Kaihotsu | |
| 2013/0239058 | A1 | 9/2013 | Yao et al. | |
| 2013/0311920 | A1 | 11/2013 | Koo et al. | |
| 2014/0096053 | A1 | 4/2014 | Lee et al. | |
| 2014/0176456 | A1 | 6/2014 | Yoon | |
| 2014/0201637 | A1 | 7/2014 | Na et al. | |
| 2014/0237367 | A1 | 8/2014 | Jung et al. | |
| 2014/0307463 | A1 | 10/2014 | Paik | |
| 2015/0031417 | A1 | 1/2015 | Lee et al. | |
| 2015/0078034 | A1* | 3/2015 | Li | G02B 6/0068 362/613 |
| 2015/0109352 | A1* | 4/2015 | Takasaki | G09G 3/3406 345/690 |
| 2015/0163343 | A1 | 6/2015 | Kim et al. | |
| 2015/0212549 | A1 | 7/2015 | Shin et al. | |
| 2015/0253955 | A1 | 9/2015 | Chiba | |
| 2015/0302805 | A1* | 10/2015 | Miyata | G02B 6/0041 345/690 |
| 2015/0309691 | A1 | 10/2015 | Seo et al. | |
| 2015/0317934 | A1* | 11/2015 | Takasaki | G09G 3/3426 345/690 |
| 2016/0150221 | A1* | 5/2016 | Lee | G02B 6/0045 348/59 |

FOREIGN PATENT DOCUMENTS

| | | | |
|---|---|---|---|
| CN | 104052838 | | 9/2014 |
| JP | 2007282196 | A1 | 10/2007 |
| JP | 2009159253 | A1 | 7/2009 |
| JP | 2010239300 | A1 | 10/2010 |
| JP | 2014-137961 | A | 7/2014 |
| JP | 2014137961 | | 7/2014 |
| KR | 10-2007-0016512 | A | 2/2007 |
| KR | 2007016512 | | 2/2007 |
| KR | 10-2007-0119227 | A | 12/2007 |
| KR | 2007119227 | | 12/2007 |
| KR | 10-2010-0023602 | A | 3/2010 |
| KR | 2010023602 | | 3/2010 |
| KR | 10-2011-0129574 | A | 12/2011 |
| KR | 2011129574 | | 12/2011 |
| KR | 10-2013-0085542 | A | 7/2013 |
| KR | 2013085542 | | 7/2013 |
| KR | 10-2014-0043644 | A | 4/2014 |
| KR | 10-2014-0090715 | A | 7/2014 |
| KR | 2014043644 | | 7/2014 |
| KR | 2014090715 | A1 | 7/2014 |
| KR | 10-2015-0018349 | A | 2/2015 |
| KR | 2015018349 | | 2/2015 |

OTHER PUBLICATIONS

International Search Report and Written Opinion for International Application No. PCT/KR2015/013200, dated Mar. 24, 2016.
Communication Pursuant to Article 94(3) EPC issued in European Application No. 15002044.4, dated Aug. 9, 2016.
Extended European Search Report for European Application No. 15002044.4, dated Sep. 1, 2015.
Communication Pursuant to Article 94(3) EPC issued in European Application No. 17173771.1 dated Apr. 18, 2018.
Non-Final Office Action in U.S. Appl. No. 16/819,704, dated Aug. 6, 2021, 26 pages.
Office Action issued in Chinese Application 2015-10411634, dated Sep. 3, 2019, with English-language translation.

* cited by examiner

DISPLAY PANEL AND MOBILE TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: More than one reissue application has been filed for the reissue of U.S. Pat. No. 9,799,276. The reissue applications are: (1) the present application, application Ser. No. 16/013,700, filed on Jun. 20, 2018; (2) application Ser. No. 16/819,704, filed on Mar. 16, 2020, which is a divisional reissue application of application Ser. No. 16/013,700; and (3) application Ser. No. 16/819,912, filed on Mar. 16, 2020, which is also a divisional reissue application of application Ser. No. 16/013,700.*

This [application] *is an application for reissue of U.S. Pat. No. 9,799,276, which issued on Oct. 24, 2017, from U.S. patent application Ser. No. 15/431,212, filed Feb. 13, 2017, which* is a [Continuation] *continuation* of [copending] U.S. patent application Ser. No. 15/047,275, filed Feb. 18, 2016, which is a [Continuation] *continuation* of *U.S. patent application* Ser. No. 14/720,200, filed on May 22, 2015[(Now], *now* U.S. Pat. No. 9,305,505, [Issued on] *issued* Apr. 5, 2016[)], which claims priority [to] *from* Korean Patent Application No. 10-2015-0028947, filed in the Republic of Korea on Mar. 2, 2015, all of which are hereby expressly incorporated by reference into the present application.

BACKGROUND OF THE DISCLOSURE

Field of the Disclosure

Embodiments of the present disclosure relate to a display panel which can display an image on a predetermined area of a display unit and a mobile terminal including the same.

Background of the Disclosure

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. As the multimedia function is strengthened, a display unit of a mobile terminal is enlarged and an image quality is enhanced in a form of high resolution. Accordingly, a significant amount of electricity is consumed in driving the display of the mobile terminal.

As the display unit is active longer, the power consumption is increased. However, when some area of the related art display unit is activated, an actual overall screen is activated and the other area, except the image displaying area, displays a black color and there is little difference in the actual amount of the consumed power, which increases the power consumption.

SUMMARY OF THE DISCLOSURE

Accordingly, an object of the present disclosure is to address the above-noted and other problems.

Another object of the present disclosure is to provide a mobile terminal which minimizes the power consumed by the display unit, when the display unit displays an image in a predetermined area thereof.

To achieve these and other advantages and in accordance with the purpose of the present invention, as embodied and broadly described herein, the present invention provides in one aspect a display panel including a light guide plate; a main light source configured to emit light from a first lateral surface of the light guide plate in a first direction; a sub-light source configured to emit light from a second lateral surface vertical to the first lateral surface of the light guide plate in a second direction perpendicular to the first direction; and a liquid crystal panel provided in a front surface of the light guide plate and configured to output image information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function The accompanying drawings are used to help easily understand various technical features and the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
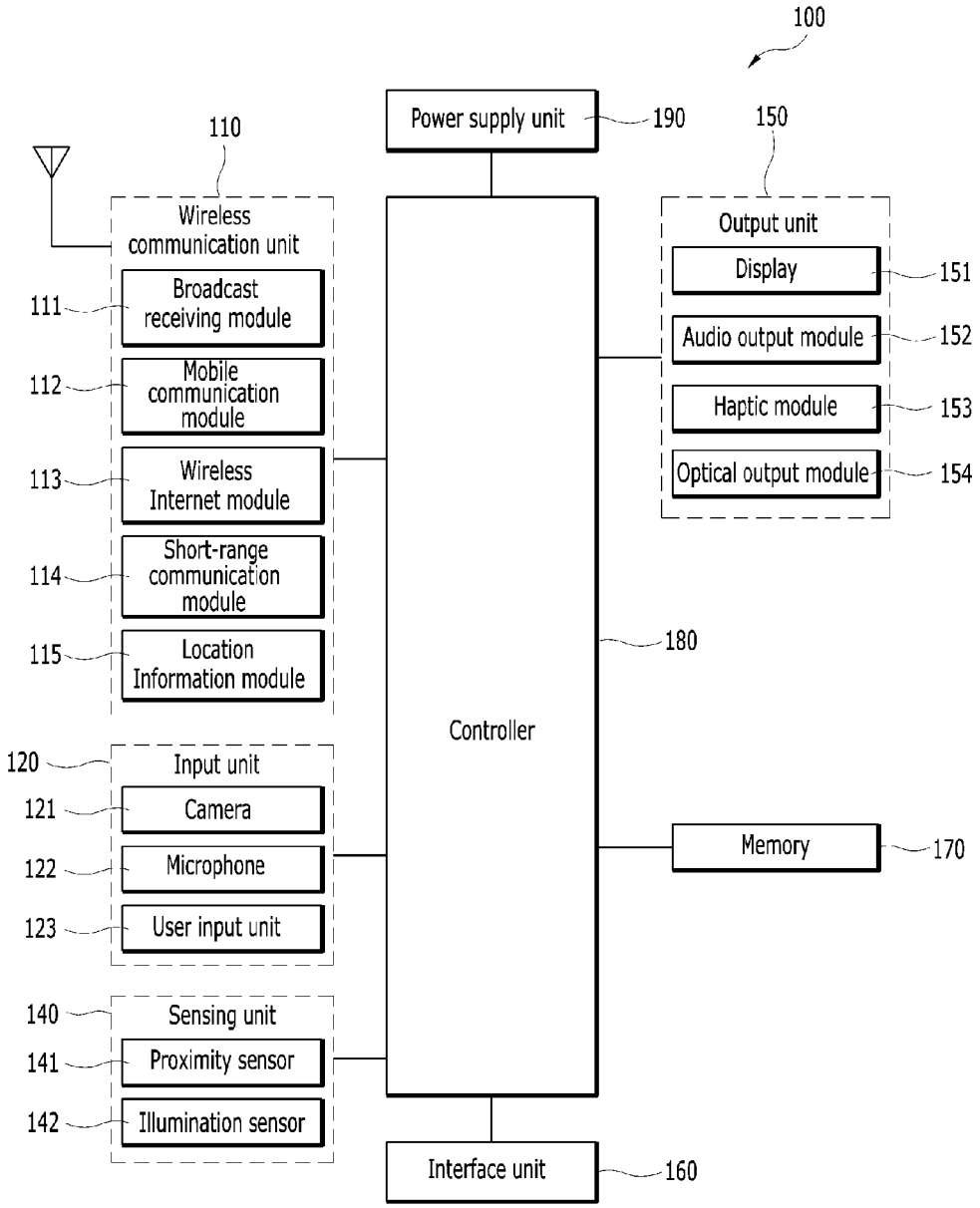
FIG. 1A is a block diagram of a mobile terminal according to an embodiment the present disclosure.
Figure 1B:
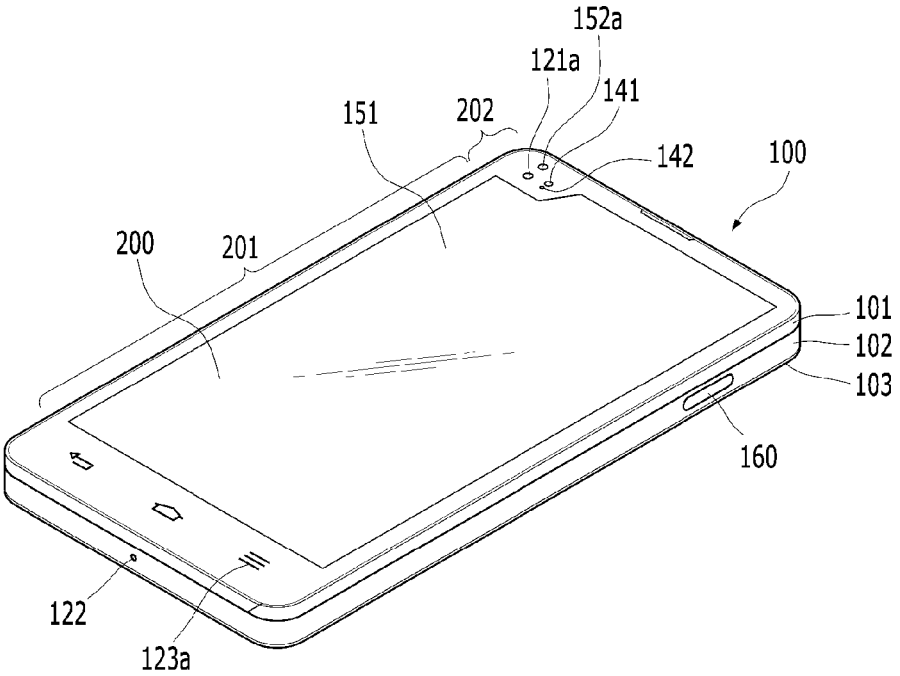
FIGS. 1B and 1C are conceptual views of one example of the mobile terminal, viewed from different directions.
Figure 1C:
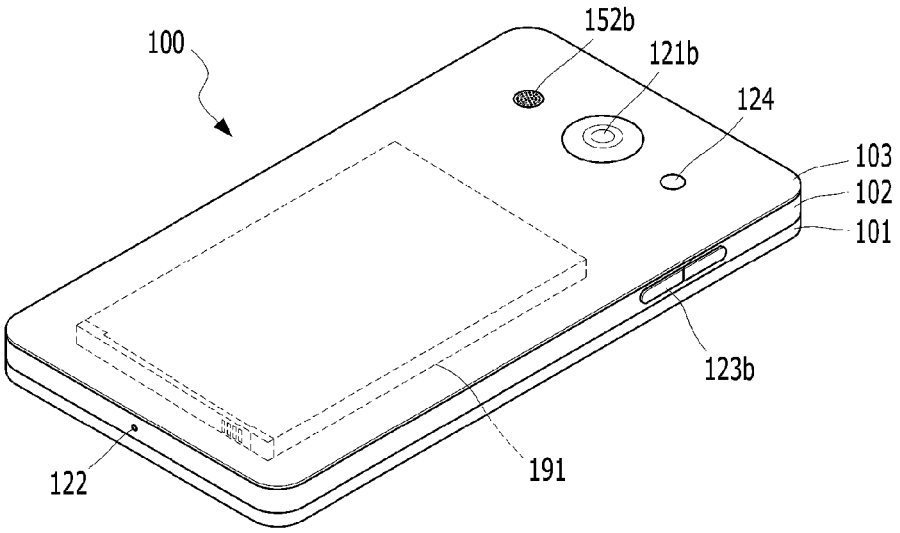

Reference is now made to FIGS. 1A-1C, where FIG. 1A is a block diagram of a mobile terminal 100 according to an embodiment of the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102. A rear case 103 can also be provided.

The display unit 151 is shown located on the front side of the terminal body to output information. A window of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window and a display on a rear surface of the window, or a metal wire which is patterned directly on the rear surface of the window. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123. Therefore, the touch screen can replace at least some of the functions of the first manipulation unit 123a. The display unit 151 according to an embodiment of the present disclosure may be divided into two areas arranged in parallel along a first direction. The two areas may be independently controlled and one of the two areas may be selectively activated if necessary, so that power consumption can be reduced. In FIG. 1B, the display unit 151 includes a display panel 200 having first and second areas 201 and 202.

For example, the first area 201 may be an area outputting image information and the second area 202 may be an area displaying a status bar for displaying a status of the mobile terminal. When the user is not using the mobile terminal 100, the first area 201 may be in an OFF status and the second area 202 may be in an ON status where the user can check a status of the mobile terminal or a new event even when not using the mobile terminal.

The second area 202 shown in the drawing may have a smaller width than the first area 201 or the first and second areas 202 may have the same width. In the latter case, a larger area may be utilized as a display area. However, a bezel located in an edge area (a non-display area formed in an edge area around a display area of the display panel) disadvantageously increases. Further, the first audio output module 152a may be implemented in the form of a speaker to output voice audio, alarm sounds, multimedia audio reproduction, and the like.

The window of the display unit 151 will typically include an aperture to permit audio generated by the first audio output module 152a to pass. One alternative is to allow audio to be released along an assembly gap between the structural bodies (for example, a gap between the window and the front case 101). In this instance, a hole independently formed to output audio sounds may not be seen or is otherwise hidden in terms of appearance, thereby further simplifying the appearance and manufacturing of the mobile terminal 100.

The optical output module can be configured to output light for indicating an event generation. Examples of such events include a message reception, a call signal reception, a missed call, an alarm, a schedule notice, an email reception, information reception through an application, and the like. When a user has checked a generated event, the controller 180 can control the optical output unit to stop the light output. In addition, the first camera 121a can process image frames such as still or moving images obtained by the image sensor in a capture mode or a video call mode. The processed image frames can then be displayed on the display unit 151 or stored in the memory 170.

Further, the first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 serves as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

In addition, the second camera 121b is shown located at the rear side of the terminal body and includes an image capturing direction that is substantially opposite to the image capturing direction of the first camera unit 121a. If desired, the second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

The power supply unit 190 for supplying power to the mobile terminal 100 may include a battery 191, which is mounted in the terminal body or detachably coupled to an outside of the terminal body. The battery 191 can receive power via a power source cable connected to the interface unit 160. Also, the battery 191 can be recharged in a wireless manner using a wireless charger. Wireless charging may be implemented by magnetic induction or electromagnetic resonance.

Figure 2:
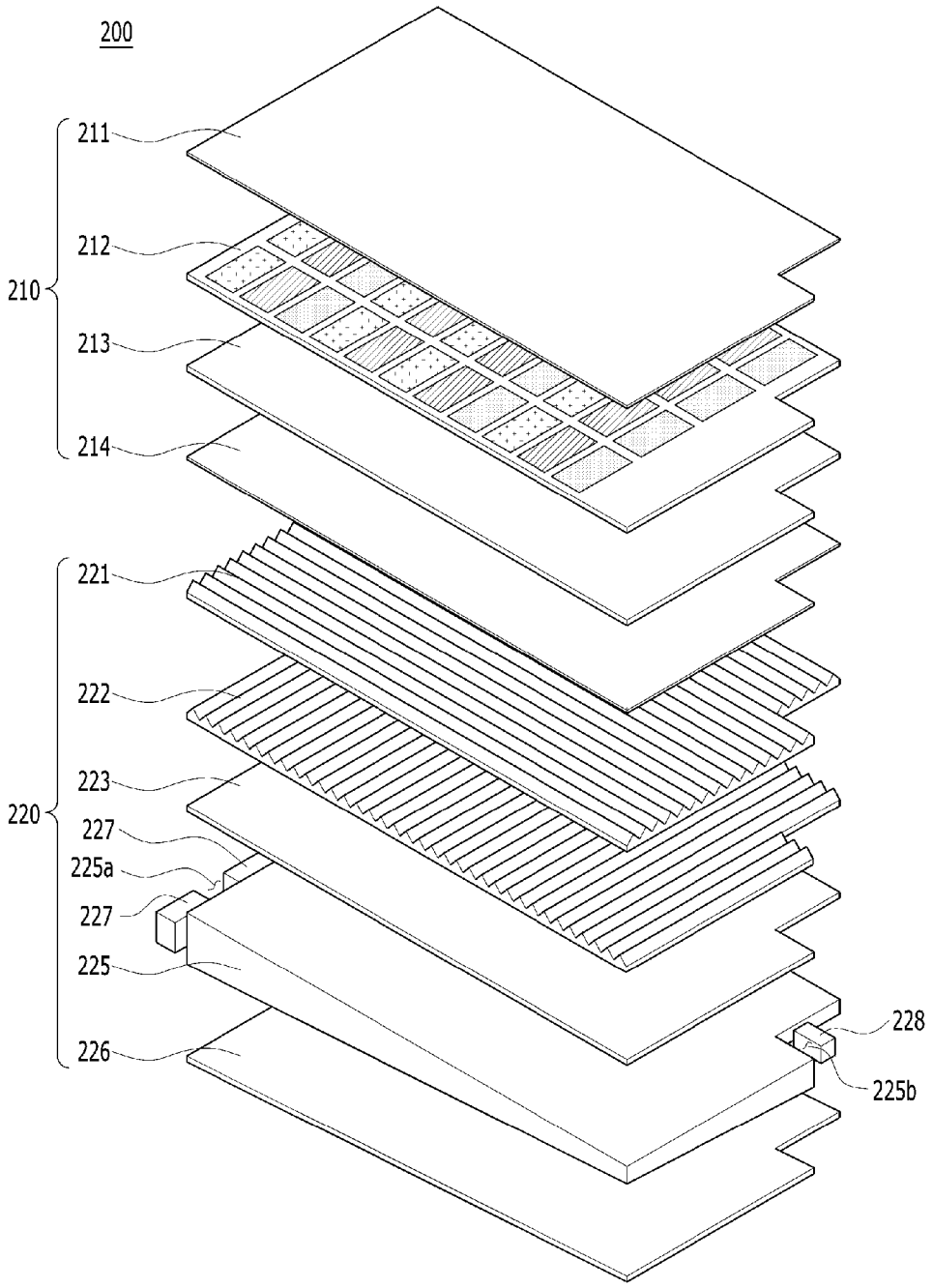
FIG. 2 is an exploded perspective diagram illustrating a display panel according to an embodiment of the present disclosure.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102. An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen Next, FIG. 2 is an exploded perspective illustrating a display panel 200 according to an embodiment of the present disclosure. Referring to FIG. 2, the display panel 200 may include a liquid crystal panel 210 and a backlight unit 220. The backlight unit 220 is configured to emit light provided from light sources 227 and 228 forwardly to a front surface of the display panel 200 uniformly. The backlight unit 220 includes light sources 227 and 228, a light guide plate 225, polarizing plate (prism sheets) 221, 222, a diffusion plate 223 and a reflector 226.

The light sources 227 and 228 are arranged in a lateral surface of the light guide plate 225 to supply the light to the lateral surface. The light guide plate 225 diffuses the light supplied by the light sources therein, using total reflection. In more detail, the total reflection is a characteristic activated in the light guide plate 225 only when an incident angle of the light is less than a critical angle. The light incident on the lateral surface is incident at a critical angle or more and then diffused while totally reflected in the light guide plate 225. Further, when the incident angle of the light is bent at the less than the critical angle, the light is emitted from the light guide plate 225.

Further, uniform unevenness is formed in a surface of the light guide plate to emit the light incident from the lateral surface to the liquid crystal panel 210 forwardly. For example, a semi-spherical-shaped projection is formed in a rear surface of the light guide plate 225 to guide the light to be diffused and emitted forwardly. The density, the size and the like of the unevenness can be adjusted to emit the uniformly diffused light to the front surface. In addition, the reflector 226 may be provided under the rear surface of the light guide plate 225 and re-reflects the light escaping from rear surface of the light guide plate 225 toward the front surface, to prevent loss of the light.

The diffusion plate 223 is disposed in front of the front surface of the light guide plate 225 and diffuses the light emitted from the light guide plate 225 more uniformly, to make the light a surface-light source. In addition, two prism sheets 221 and 222 may be disposed on a top surface of the diffusion plate 223 and bend the light spread in a lateral direction to a forward direction, to secure brightness in a forward direction.

Figure 3:
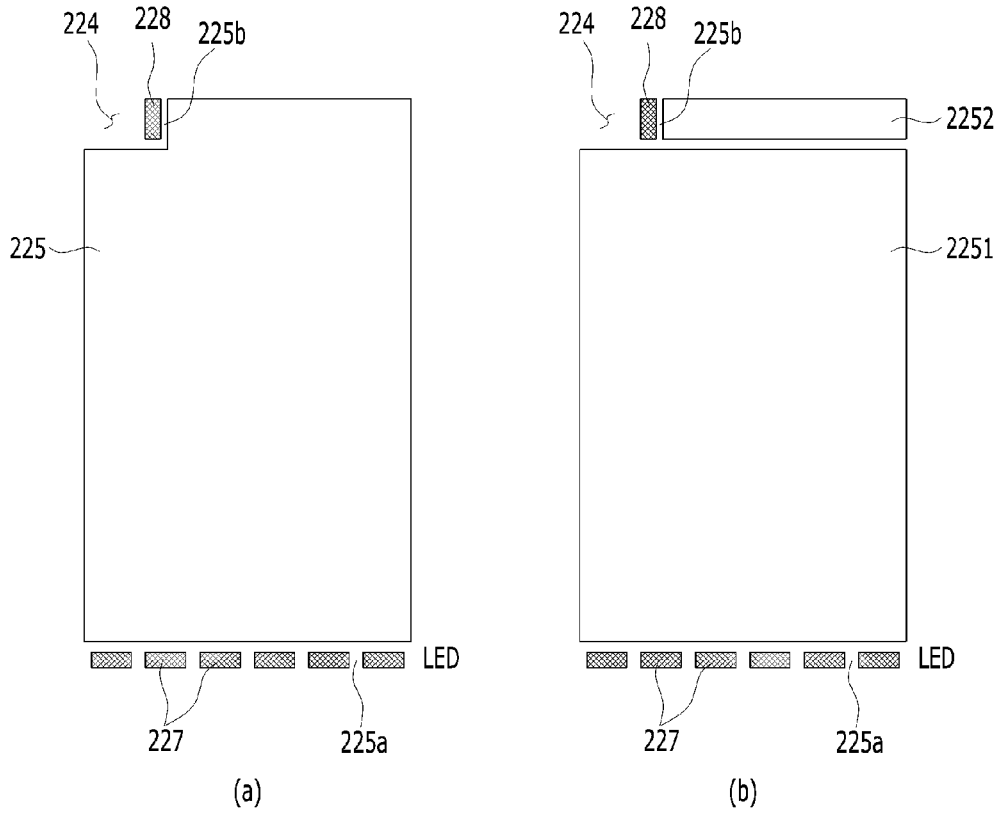
FIG. 3 is a front view illustrating a light guide plate and a light source provided in the display panel according to an embodiment of the present disclosure.

In more detail, FIG. 3 is a front view illustrating the light guide plate 225 and the light sources 227 and 228 provided in the display panel 200. In FIG. 3, a main light source 227, a sub-light source 228 and the light guide plate 225 are shown. Different from a related art backlight unit including light sources supplied in one direction, the backlight unit 220 according to an embodiment of the present disclosure includes light sources supplied in two directions.

In particular, main light sources 227 arranged along a first lateral surface 225a of the light guide plate 225 supply light to an entire area of the light guide plate 225 uniformly. The plurality of the main light sources 227 may be spaced apart a predetermined distance from the first lateral surface 225a. A second lateral surface 225b of the light guide plate 225 is provided in a perpendicular direction with respect to the first lateral surface 225a and the sub-light source 228 can supply light to an end opposite to the first lateral surface where the main light sources are arranged.

In addition, the light guide plate 225 may be rectangular-shaped. As shown in FIG. 3, the light guide plate 225 may have a dent 224 dent formed in one corner of the light guide plate 225. One of lateral surfaces forming the dent is vertical to the first lateral surface 225a and the lateral surface is the second lateral surface 225b to have the light incident emitted from the sub-light source 228 thereon. Further, the main light sources 227 and the sub-light source 228 can be driven independently. When the main light sources 227 are off, only the sub-light source 228 can be controlled to be on.

Figure 4:
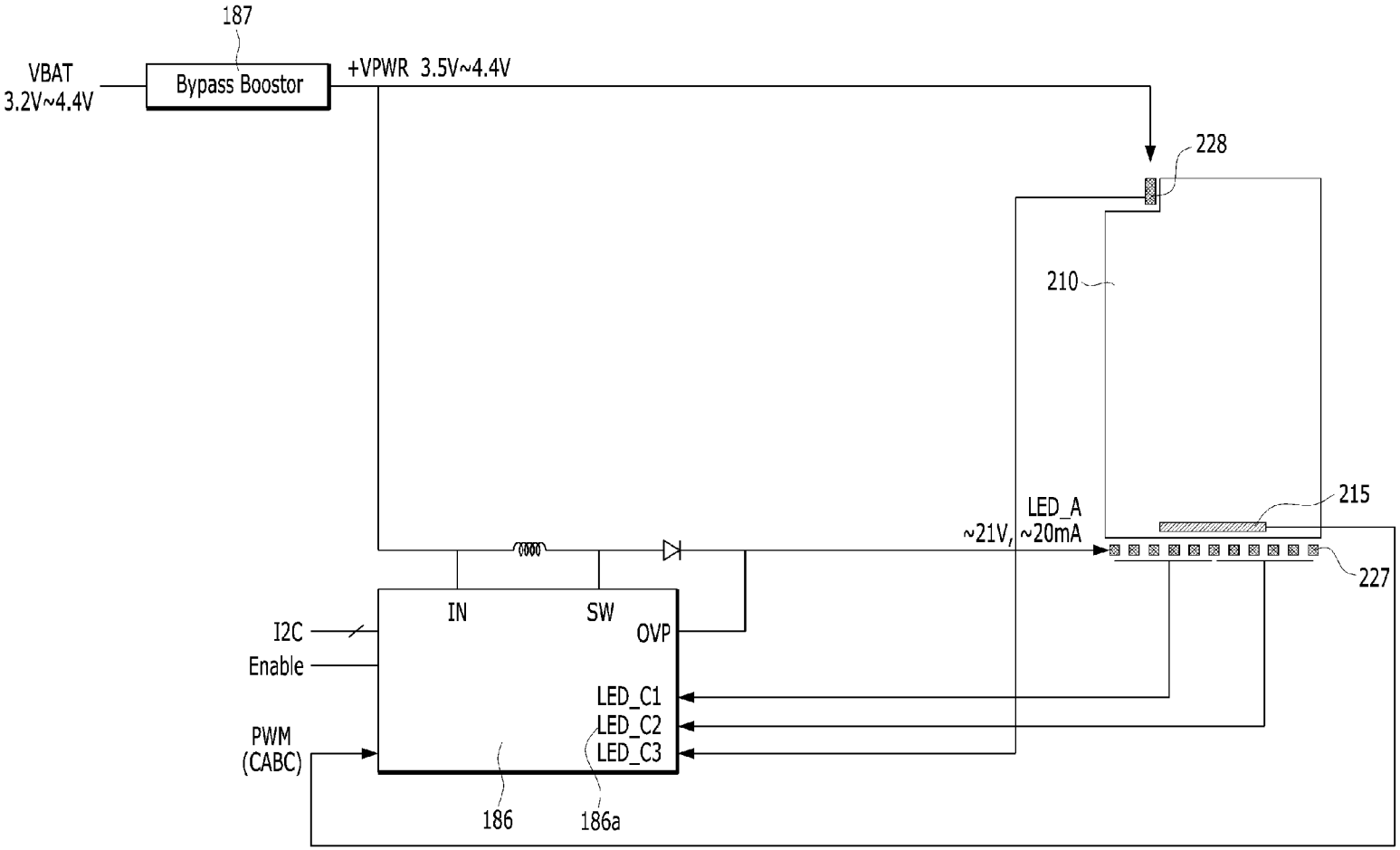
FIGS. 4 and 5 are diagrams illustrating an IC circuit controlling a main light source and a sub light source according to an embodiment of the present disclosure.
Figure 5:
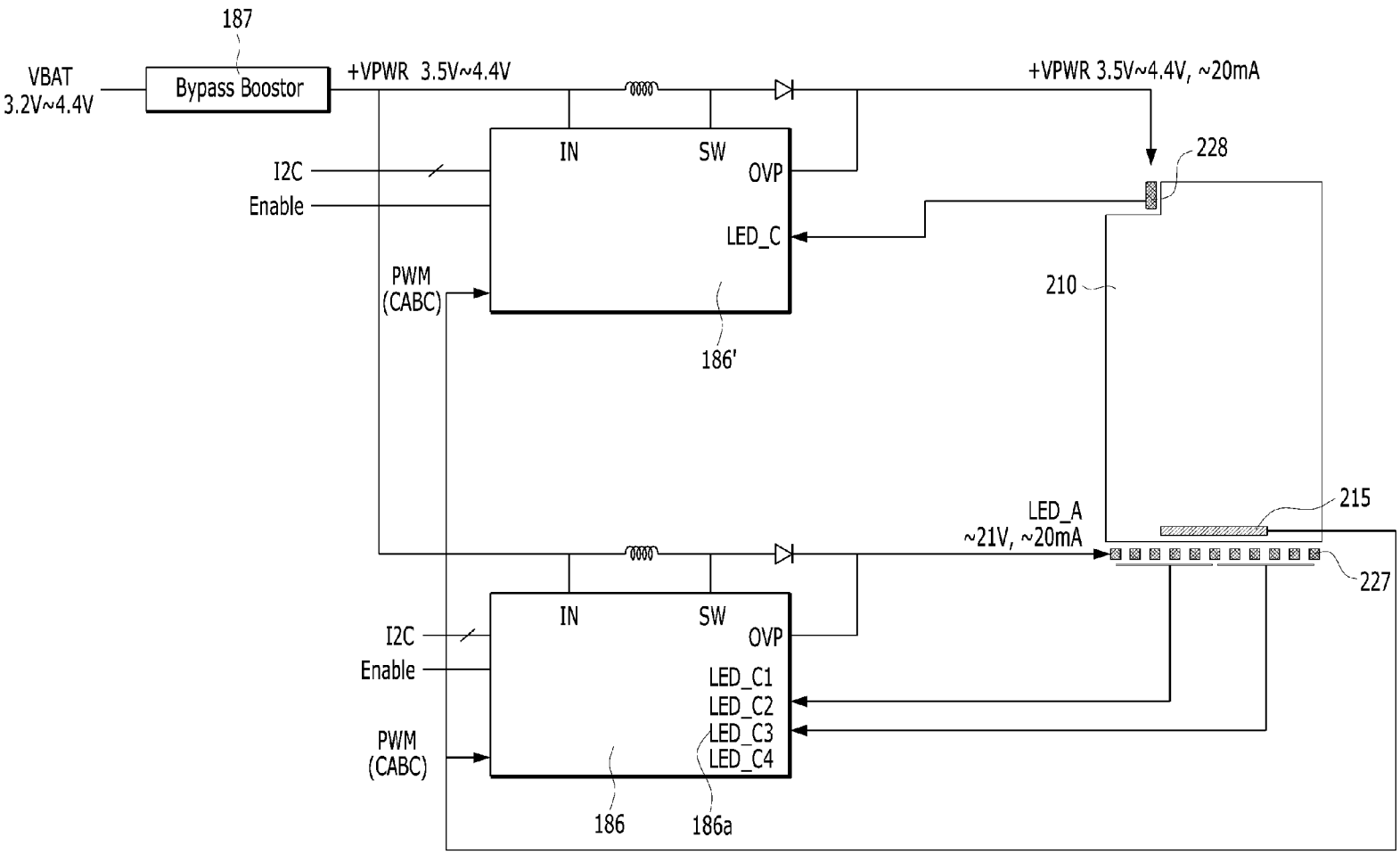

Next, FIGS. 4 and 5 are diagrams illustrating an IC circuit configured to control the main light sources 227 and the sub-light source 228. In the IC circuit shown in FIG. 4, one backlight IC 186 controls the main light sources 227 and the sub-light source 228. In the IC circuit shown in FIG. 5, two backlight ICs 186 control the main light sources 227 and the sub-light source 228.

In more detail, the power supply unit 190 supplies the electric power to both of the main light sources 228 and the sub-light source 228. Noise is eliminated, using a bypass booster 187, so that a stable power can be supplied. When the backlight IC 186 applies a signal to the light sources 227 and 228, light can be emitted from the light sources 227 and 228. In this instance, the backlight IC 186 can adjust a brightness of LEDs 186a arranged in each of the light sources up to 2000 levels or more. An optimal brightness of the backlight to see a corresponding image may be determined based on information from low data of an image transmitted from a drive IC 215 of the liquid crystal panel 210 (CABC: Content Adaptive Brightness Control).

When using one backlight unit IC 186 shown in FIG. 4, one LED channel is further used so as control the sub-light source 228, instead of using the related art backlight IC 186. As shown in FIG. 5, an auxiliary backlight IC 186' may be further provided to control only the sub-light source 228. Further, the plurality of the main light sources 227 may be provided in parallel, adjacent to the first lateral surface 225a, to supply the light to the entire area of the light guide plate 225. On the contrary, one or two sub-light sources fewer than the main light sources 227 can be provided to supply light to a predetermined area of the light guide plate 225.

In addition, the light guide plate 225 shown in FIG. 3 (a) may be integrally formed as one body and it may be supplied with light not only by the main light sources 227 but also by the sub-light source 228. Alternatively, the light guide plate 225 shown in FIG. 3 (b) may include a first light guide plate 2251 configured to emit the light supplied by the main light sources 227 toward the front surface of the display panel 200 and a second light guide plate 2252 configured to emit the light supplied by the sub-light source 228 toward the front surface of the display panel 200.

When the light guide plate is the one body type shown in FIG. 3 (a), the main light sources 227 can supply light to the second area 202 as well as the first area 201. Accordingly, the sub-light source 228 need not be on advantageously, when the main light sources 227 are on. Also, an image continuously displayed on the second area 202 and the first area 201 can be output.

Meanwhile, when the light guide plate is the divided type including the first light guide plate 2251 and the second light guide plate 2252 shown in FIG. 3 (b), the light supplied by the main light sources 227 can be transmitted only to the first area 201 through the first light guide plate 2251 and the light supplied by the sub-light source 228 can be transmitted only to the second area 202 through the second light guide plate 2252.

In addition, the sub-light source 228 is driven to output information on the second area 202, even when the main light sources 227 are on. When information is displayed only on the second area 202, the light does not need to be supplied to the first area 201 and an image having a high brightness can be displayed, using a small number of light sources (LED lamps).

Further, the main light sources 227 and the sub-light source 228 are combinedly connected to a main printed circuit board or independently connected to the main printed circuit board. The controller 180 can thus independently control the main light sources 227 and the sub-light source 228.

As the sub-light source 228 is arranged in the second lateral surface 225b, a bezel of the second lateral surface 225b could increase. For a large display unit, the large size of the bezel increased by the sub-light source 228 is not significant compared to the overall size. However, the size of the bezel is a quite important factor in determining the overall size of a small sized mobile terminal. In other words, a first corner opposite to the second lateral surface 225b where the sub-light source 228 is dented and thus prevents the increase of the lateral-direction bezel. That is, the sub-light source 228 is formed in the dent 224 so that the bezel can be prevented from increasing toward the lateral surface.

In the embodiment shown in FIG. 3 (b), the width of the second light guide plate 2252 can be equal to the width of the first light guide 2251 when the width of the first area 201 is equal to the width of the second area 202. When the dent 224 is provided in first corner of the light guide plate 225, the width of the second light guide plate 2252 can be smaller than the width of second light guide plate 2252.

Figure 6:
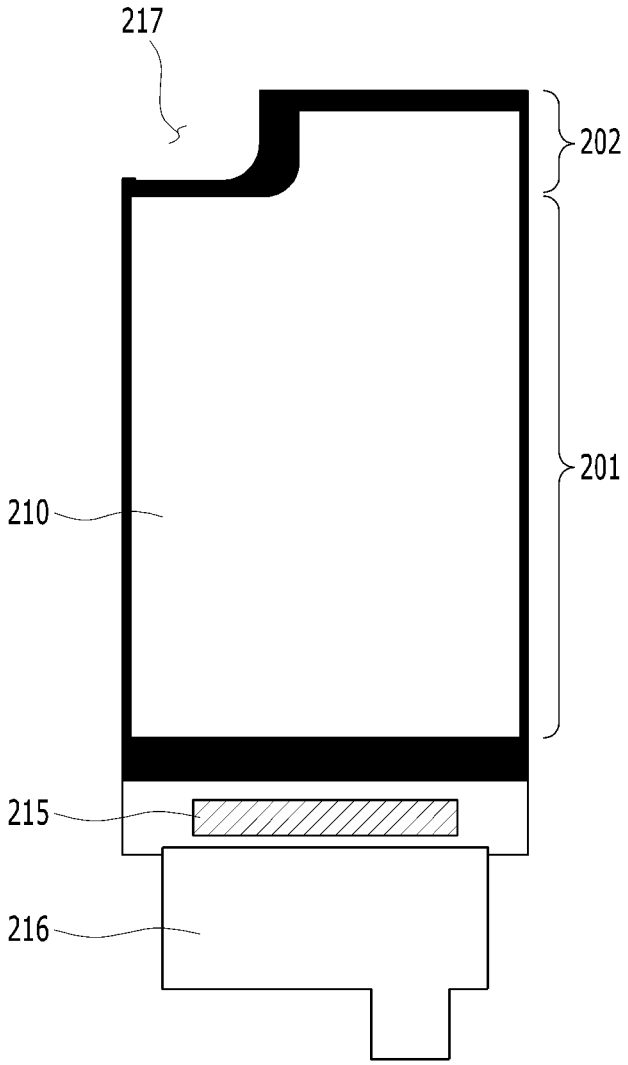
FIG. 6 is a front view illustrating a liquid crystal panel of the display panel according to an embodiment of the present disclosure.

Next, FIG. 6 is a front view illustrating the liquid crystal panel 210 of the display panel 200 according to an embodiment of the present disclosure. The size of the liquid crystal panel 210 is similar to the size of the light guide plate 225. When the dent 224 is provided in the light guide plate 225, a dent 217 may be formed in a corner of the liquid crystal panel 210, corresponding to the dent 224 of the light guide plate 225.

While the light guide plate 225 is divided into the portion corresponding to the first area 201 and the other portion corresponding to the second area 202, the liquid crystal panel 210 may have a united portion and be controlled by one drive IC. The drive IC can be connected with the liquid crystal panel 210 via a main printed circuit board and a flexible printed circuit board 216, so that it can apply the electric power to each pixel according to an image signal transmitted from the main printed circuit board and adjust liquid crystal arrangement.

Further, the liquid crystal panel 210 selectively applies the power to pixels to change the arrangement of the liquid crystal and outputs different colors for pixels to provide an image. As shown in FIG. 2, the liquid crystal panel 210 includes a color filter layer 212 and a thin film transistor layer 213. The color filter layer 212 includes a color filter and a common electrode. In addition, the color filter has a red filter, a green filter and a blue filter for pixels. The thin film transistor layer 213 may include a plurality of thin film transistors provided corresponding to colors of the color filters, respectively.

When the power is applied to the thin film transistors, the liquid crystal arrangement of a corresponding pixel is changed and light is selectively penetrated to output a color according to image information for each pixel. A gate voltage and a data voltage are also applied to the thin film transistor. When a data voltage larger than a gate voltage is applied, the liquid crystal arrangement of the corresponding pixel is changed.

In more detail, liquid crystal is injected between the color filter layer 212 and the thin film transistor layer 213 and polarizing films 211 and 214 are disposed on an outer surface of the color filter layer 212 and an outer surface of the thin film transistor layer, respectively, and the light may be aligned forwardly. Further, the display panel 200 including the liquid crystal panel 210 and the backlight unit 220 can be arranged in the front surface of the mobile terminal 100 as shown in FIG. 1B, to output information according to the control of the controller 180 provided in the mobile terminal 100.

Figure 7:
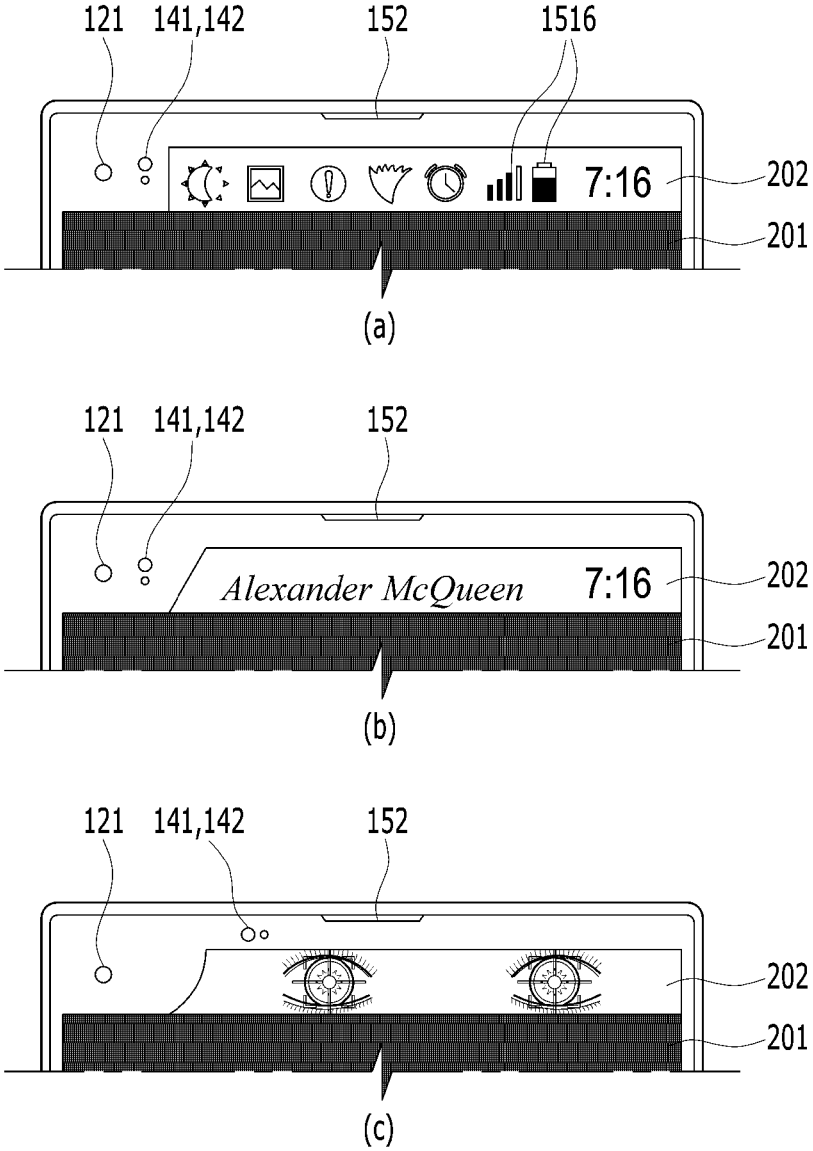
FIG. 7 is a front view illustrating various embodiments of a front top end of the mobile terminal according to an embodiment of the present disclosure.

Next, FIG. 7 is a front view illustrating various embodiments of a front top end of the mobile terminal 100 according to an embodiment of the present disclosure. When the display panel 200 includes the dent 224, the sub-light source 228 is located in the dent 224. Also, the camera 121, the proximity sensor 141, the illumination sensor 142 and a receiver hole for outputting a sound of the audio output module 152 can be arranged in the dent 224.

As the camera 121, the proximity sensor 141 and the illumination sensor 142 are provided in the dent 224, the size of the bezel provided in an upper end portion of the display panel 200 can be reduced. Further, the dent 224 may be rectangular as shown in FIG. 7 (a), have an inclined surface as shown in FIG. 7 (b), or have a curved surface as shown in FIG. 7 (c).

In addition, a status bar may be arranged in the second area 202 to display a status of the mobile terminal 100. Also, in the second area 202 may be displayed icons 1516 indicating a remaining amount of battery, presence of new messages, a communication status, presence of WIFI access, presence of Bluetooth connection and the like. Simple information such as time and weather can also be output in the second area 202.

When an icon 1516 indicating presence of a new event generated in the mobile terminal is displayed on the status bar, the user can drag the icon 1516 to the first area 201 to implement a function corresponding to the icon or to check specific information associated with the corresponding event. As shown in FIG. 7 (b), the user's name or a specific paragraph set by the user can be output or a new notice event (e.g., schedule notice and new message reception) may be provided to the user. The user can also set diverse contents of the status bar, while contents of the status bar are not fixed. Whenever an event is generated, different information can be output.

In addition, when user authentication not using the display panel 200, for example, iris recognition or fingerprint recognition is performed, user authentication can be guided, only using the second area 202 of the display panel 200. For example, the user's distance and location is guided as shown in FIG. 7 (c) and the user authentication for the mobile terminal 100 can then be implemented. Further, the user can adjust the size of the status bar output in the second area 202 to a deformed shape shown in FIG. 7 (b) and FIG. 7 (c) as well as an existing rectangular shaped status bar shown in FIG. 7 (a).

When using the display panel 200 according to an embodiment of the present disclosure, the first area 201 and the second area 202 can be driven independently. In particular, the liquid crystal panel 210 can be driven in a first mode configured to output information in one of the first area 201 and the second area 202 and a second mode configured to output information only in the second area 202, and not in the first area 201.

Also, the liquid crystal panel 210 can be driven in a third mode configured not to output information in the first area 201 and the second area 202 and a fourth mode configured to output information only in the first area 201, and not in the second area 202. In the first mode, the display panel is used typically. That is, the main light sources 227 and the sub-light source 228 are driven and the entire thin film transistors of the liquid crystal panel 210 are driven.

However, when the user puts the mobile terminal 100 on a desk, and is not using the mobile terminal 100, the display panel 200 can be driven in the second mode. Then, when the user touches the display panel 200 or presses a button in the third mode where the display panel 200 is off, the third mode is converted into the second mode and only the second area of the display panel 200 is activated.

In the second mode, the display panel 200 of the first area 201 is not used and the main light sources 227 configured to supply light to the first area 201 are not driven. Considering that the light sources use 70-80% of the power to drive the main light sources 227, the driving of the main light sources 227 is stopped and only the sub-light source 228 fewer than the main light sources 227 are driven. Accordingly, the power consumed by the display panel 200 can be reduced by 70%.

Figure 8:
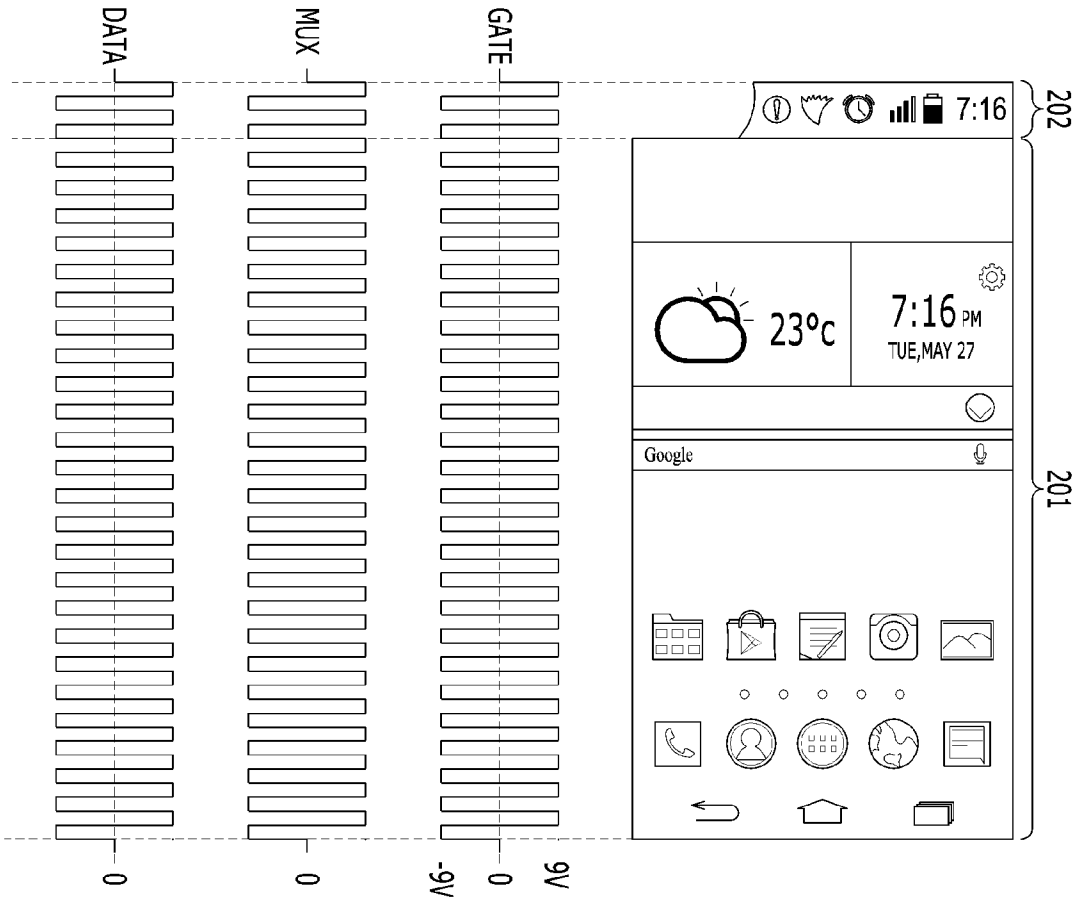
FIGS. 8 and 9 are graphs illustrating sizes of signals applied to the liquid crystal panel of the mobile terminal according to an embodiment of the present disclosure.
Figure 9:
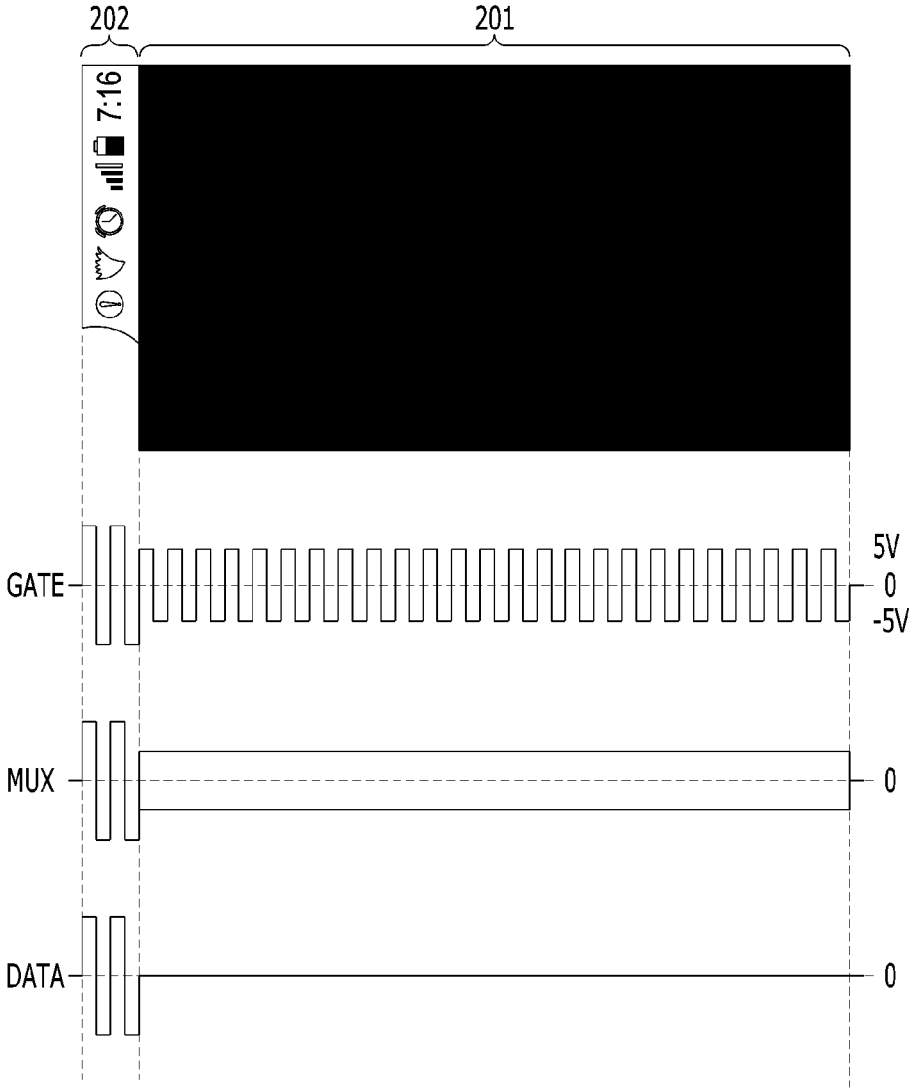

Next, FIGS. 8 and 9 are graphs illustrating signals applied to the liquid crystal panel 210. In particular, FIG. 8 is a graph illustrating voltages of a gate signal, multiplexer signal (MUX) and a data signal in the first mode, and FIG. 9 is a graph illustrating a gate signal, a multiplexer (MUX) signal and a data signal in the second mode.

As the entire screen is used in the first mode, the gate, multiplexer and data signal have to be transmitted to the first area 201 and the second area 202. Further, the gate signal is used to determine a threshold voltage of each thin film transistor. Only when a data voltage which is a voltage applied to the gate signal or more has to be applied, the liquid crystal arrangement is changed and an image is output.

In addition, the multiplexer may be arranged between the drive IC and each of the thin film transistors. Thus, the gate signal and the data signal which will be transmitted to each of the transistors may be to one multiplexer, so that the number of signal lines can be reduced. Further, the signals transmitted from the drive IC through the multiplexer can be re-distributed sequentially and then the re-distributed signals can be supplied to the transistors.

In addition, the gate signal includes a gate clock and a sheet-resistor, and the sheet-resistor receives a clock and transmits data to the next gate. The data signal is configured to drive the liquid crystal panel based on color information of each pixel. Further, a larger voltage is applied to the data signal than the gate signal when liquid crystal arrangement has to be changed and the light supplied by the backlight unit can be transmitted forwardly.

When the display panel 200 is driven in the second mode configured to activate only the second area 202, with the first area 201 being off, as shown in FIG. 9, a data signal corresponding to the first area may not be transmitted and the data signal of the first area 201 may be 0V. With no data signal and outputting no image, the multiplexer does not need to distribute the signals and clocking of the signals. Further, the multiplexer can control a value of the applied voltage to be 0V.

Meanwhile, the gate signal has to calculate a gate clock to be synchronized with the location of each thin film transistor. In particular, the gate signal has to be clocked at preset intervals even in the first area 201 where no data is output. As no data signal is applied actually in the first area 201, the voltage of the gate signal is not important and the size of the gate signal is set to be small. For example, the voltage of the gate signal has to be ±9V in the second area 202 where the liquid crystal arrangement is changed according to the data signal and the voltage of the gate signal can be reduced to be ±5V in the first area 201 where no gate signal is output.

As mentioned above, according to an embodiment of the present disclosure, the power consumption can be minimized when only the predetermined area of the display unit is activated. Accordingly, hours of battery use can be increased. Further, the sub-light source is arranged in the dent 224 for the second area 202 configured to output an image independently. Accordingly, the size of the mobile terminal can be prevented from increasing toward the lateral surface of the mobile terminal.

Moreover, needed and useful information can be displayed rapidly in the second area 202, which is always activated. Thus, the user does not have to activate the display unit 151 to check the time or presence of a new event. Accordingly, the user's convenience is enhanced.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A display panel comprising:

a light guide plate having a dent in one corner;

a main light source configured to emit light from a first lateral surface of the light guide plate in a first direction;

a sub-light source configured to emit light from a second lateral surface vertical to the first lateral surface of the light guide plate in a second direction perpendicular to the first direction;

a liquid crystal panel provided in a front surface of the light guide plate and configured to output image information; and a controller configured to control the sub-light source to emit light from the second lateral surface and display indication information in a second area of the liquid crystal panel when the main light source is turned off, wherein the liquid crystal panel comprises a dent corresponding to the dent of the light guide plate, wherein the sub-light source is placed at the dent of the light guide plate, and wherein one or more of a camera module[and], a proximity *sensor module,* and *an* illumination sensor module are arranged in the dent of the light guide plate.

2. The display panel of claim 1, wherein the light guide plate is rectangular-shaped, and wherein the sub-light source is arranged in the dent of the light guide plate.

3. The display panel of claim 1, wherein the light guide plate comprises:

a first light guide plate provided in a portion with respect to a first direction, the first light guide plate including the first lateral surface; and a second light guide plate provided in the other portion with respect to the first direction, the second light guide plate including the second lateral surface, and wherein the main light source emits light to the first light guide plate and the sub-light source emits light to the second light guide plate.

4. A mobile terminal comprising:

a wireless communication unit configured to provide wireless communication;

a display panel including a light guide plate having a dent in one corner; a main light source configured to emit light from a first lateral surface of the light guide plate in a first direction; a sub-light source configured to emit light from a second lateral surface vertical to the first lateral surface of the light guide plate in a second direction perpendicular to the first direction; and a liquid crystal panel provided in a front surface of the light guide plate and configured to output image information; and a controller configured to:

control the sub-light source to emit light from the second lateral surface and display indication information in a second area of the liquid crystal panel when the main light source is turned off, wherein the liquid crystal panel comprises a dent corresponding to the dent of the light guide plate, wherein the sub-light source is placed at the dent of the light guide plate, and wherein one or more of a camera module[and], a proximity *sensor module,* and *an* illumination sensor module are arranged in the dent of the light guide plate.

5. The mobile terminal of claim 4, wherein the light guide plate is rectangular-shaped, and wherein the sub-light source is arranged in the dent of the light guide plate.

6. The mobile terminal of claim 5, further comprising:

a receiver hole configured to output sound of an audio output module arranged in the dent of the light guide plate.

7. The mobile terminal of claim 4, wherein the light guide plate comprises:

a first light guide plate provided in a portion with respect to a first direction, the first light guide plate including the first lateral surface; and a second light guide plate provided in the other portion with respect to the first direction, the second light guide plate including the second lateral surface, and wherein the main light source emits light to the first light guide plate and the sub-light source emits light to the second light guide plate.

8. The mobile terminal of claim 4, wherein the liquid crystal panel comprises a first area provided in a portion with respect to the first direction and the second area provided in the other portion with respect to the first direction, and wherein the controller is further configured to drive the liquid crystal panel in one of a first mode configured to display information in the first area and the second area and a second mode configured to display the indication information only in the second area, and not display the information in the first area.

9. The mobile terminal of claim 8, wherein the controller is further configured to drive only the sub-light source and not the main light source in the second mode.

10. The mobile terminal of claim 8, wherein the liquid crystal panel comprises:

a plurality of thin film transistors configured to change an arrangement of liquid crystal in response to an applied gate voltage and a data voltage, wherein the controller further configured to control the gate voltage applied to the thin film transistor of the first area is smaller than the gate voltage applied to the thin film transistor of the second area.

11. The mobile terminal of claim 10, wherein the controller is further configured to control the data voltage applied to the thin film transistor of the first area in the second mode to be 0 (zero).

12. The mobile terminal of claim 11, further comprising:

a drive IC configured to transmit a signal to the plurality of the thin film transistors based on a control signal transmitted from the controller; and a multiplexer (MUX) provided between the drive IC and the plurality of the thin film transistors to distribute a signal to the plurality of the thin film transistors, wherein the controller is further configured to restrict the driving of the multiplexer to distribute the signal to the thin film transistor of the first area in the second mode.

13. The mobile terminal of claim 11, wherein in the second mode, the gate voltage applied to the thin film transistor of the second area is 9V or more and the gate voltage applied to the thin film transistor of the first area is greater than 0V and equal to or less than 5V.

14. The mobile terminal of claim 4, *wherein the liquid crystal panel comprises a first area,* wherein the indication information includes an icon indicating a status of the mobile terminal, and wherein the controller is further configured to execute a function corresponding to the icon, in response to the icon being dragged from the second area to the first area.

15. The mobile terminal of claim 4, wherein the controller is further configured to display a guide image for unlocking the mobile terminal in the second area.

16. The mobile terminal of claim 4, wherein the controller is further configured to display updated indication information in the second area in response to a new event on the mobile terminal.

17. The mobile terminal of claim 4, wherein the dent of the light guide plate comprises a rectangular shape, a shape with an inclined surface or a shape with a curved surface.

18. The mobile terminal of claim 4, wherein the second area corresponds to a status bar displaying the indication information indicating a status of the mobile terminal.

*19. The mobile terminal of claim 4, wherein the display panel comprises a touch sensor configured to sense a touch input.*

* * * * *